United States Patent [19]
Nishiyama et al.

[11] Patent Number: 4,873,660
[45] Date of Patent: Oct. 10, 1989

[54] ARITHMETIC PROCESSOR USING REDUNDANT SIGNED DIGIT ARITHMETIC

[75] Inventors: Tamotsu Nishiyama; Shigeo Kuninobu, both of Osaka, Japan

[73] Assignee: Matsushita Electric Industrial Co., Ltd., Osaka, Japan

[21] Appl. No.: 66,817

[22] Filed: Jun. 25, 1987

[30] Foreign Application Priority Data

Jun. 27, 1986 [JP] Japan .................. 61-152451
Jun. 27, 1986 [JP] Japan .................. 61-152452
Jun. 27, 1986 [JP] Japan .................. 61-152455

[51] Int. Cl.$^4$ ............................................. G06F 7/49
[52] U.S. Cl. ..................................... 364/768; 364/761
[58] Field of Search ................... 364/761, 754, 768

[56] References Cited

PUBLICATIONS

Avizienis, "Binary-Compatible Signed-Digit Arithmetic" *Proceedings-Fall Joint Computer Conference*, 1964, pp. 663-672.
Tung "Division Algorithm for Signed-Digit Arithmetic" *IEEE Trans. on Computers*, Sep. 1968, pp. 887-889.
Atkins, "Design of the Arithmetic Units of Illiac III: Use of Redundancy & Higher Radix Methods" *IEEE Trans. on Computers*, vol. c-19 No. 8, Aug. 1970, pp. 720-733.
A VLSI-Oriented High-Speed Divider Using Redundant Binary Representation, Takagi, et al, IECE Japan, vol. 167 D #4, pp. 450-457 4/84.
A VLSI-Oriented High-Speed Multiplier Using Redundant Binary Adder Tree, Takagi, et al. IECE Japan, vol. J66.d, pp. 683-690 6/84.
A New Class of Digital Division Methods, James Robertson, IRE Transactions on Electronic Computers, pp. 218-222, 9/58.
Signed-Digit Representations for Fast Parallel Arithmetic, Avizienis, IRE Transactions on Electronic Computers, pp. 389-400, 9/61.
A Class of Binary Divisions Yielding Minimally Represented Quotients Metze IRE Transactions on Electronic Computers, pp. 761-764 12/62.
Multiple Operand Addition and Multiplication, Shanker Singh et al. IEEE Transactions on Computers, vol. C-22, No. 2 pp. 113-120, 2/73.
Concise Papers, Lyon, IEEE Transactions on Communications, pp. 418-425, 4/76.
Real-Time Processing Gains Ground with Fast Digital Multiplier, Waser, et al. Electronics, pp. 93-99, 9/77.
High Speed Multiplier Using a Redundant Binary Adder Tree, Harata, et al. IEEE International Conference on Computer Design, pp. 165-170, 1984.
High Speed VLSI Multiplication Algorithm with a Redundant Binary Addition Tree, Takagi, et al. IEEE Transactions on Computers, vol. C-34, No. 9, pp. 1789-1795, 9/85.
Design of High Speed MOS Multiplier and Divider Using Redundant Binary Representation, Kuninobu, et al., Proceedings 8th Symposium on Computer Arithmetic, pp. 80-86, 5/87.

*Primary Examiner*—David H. Malzahn
*Attorney, Agent, or Firm*—Amster, Rothstein & Ebenstein

[57] ABSTRACT

A high speed arithmetic processor which may compactly be fabricated on an LSI chip is disclosed. The arithmetic processor in a first-step arithmetic operation determines an intermediate carry (or intermediate borrow) for a higher order arithmetic operation from an internal operand such as augend (or minuend) and an addend (or subtrahend) for each digit in addition (or subtraction) of signed digit numbers, carried out as an internal arithmetic operation, and determines an intermediate sum (or intermediate difference). In a second step arithmetic operation, the processor obtains a final sum (or difference) for each digit from the intermediate sum (or intermediate difference) obtained in the first step arithmetic operation and an intermediate carry (or intermediate borrow) from a lower order arithmetic operation. The sign of an internal operand is either inverted or the internal operand is converted to 0 in accordance with the value of a control signal and then provided as the internal operand for processing in the first step arithmetic operation. Such sign inversion or conversion of the operand to zero enables the first and second step arithmetic operations to be performed utilizing addition and/or subtraction only.

20 Claims, 7 Drawing Sheets

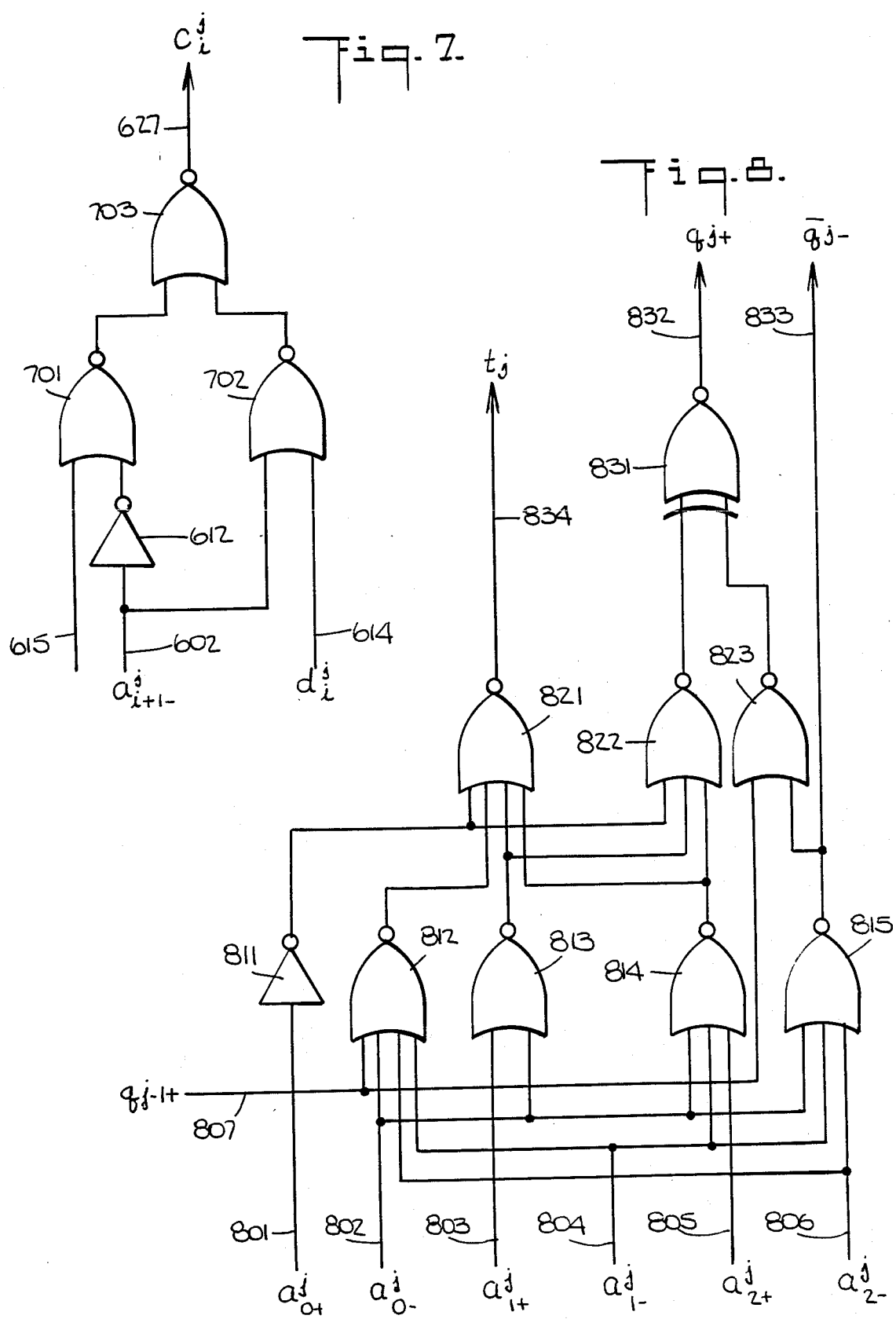

ARITHMETIC PROCESSOR USING REDUNDANT SIGNED DIGIT ARITHMETIC

BACKGROUND OF THE INVENTION

The present invention relates to an arithmetic processor capable of high-speed arithmetic operation and, more particularly, to an arithmetic processor which has a cellular array structure and which may be compactly fabricated on an LSI chip.

One type of conventional high-speed multiplier is discussed in *Trans. of IECE Japan*, Vol.J66-D, No. 6, 1983, pp. 683 to 690, and one type of conventional high-speed divider is discussed in *Trans. of IECE Japan*, Vol. J67-D, No. 4, 1984, pp. 450 to 457. That multiplier and that divider are arithmetic units each arranged to execute multiplication or division by means of combinational circuitry using the redundant binary expression (a kind of signed digit expression) in which each digit is represented by a set of elements $\{-1, 0, 1\}$. While those devices have a regular array structure and have faster arithmetic processing speeds than other types of conventional arithmetic units, no consideration is given to factors which are important for fabricating them commercially, such as a reduction in the number and size of constituent elements and use of MOS technology for a multiplier and divider which are capable of high-speed operation.

In particular, dividers in wide use today are sequential circuits each consisting of a subtracter (adder) and a shifter. However, it is well known that, as the number of digits of the operands increases, an exceedingly long time is required for those dividers to perform arithmetic operations. On the other hand, large-size computers having high-speed multipliers often employ multiplication-type division in which division is performed by repetition of multiplication. However, realization of such multiplication-type division by combinational circuitry requires large numbers of hardware elements, and is therefore impractical.

With respect specifically to a high-speed arithmetic unit employing signed digit numbers for arithmetic operation, a method has been proposed in which an arithmetic operation such as multiplication or division is realized by combinational circuitry utilizing an ECL logic element that enables NOR and OR operations to be simultaneously performed. However, exhaustive consideration has heretofore not been given to problems which must be solved to put that proposed high-speed arithmetic unit into practical use, such as reducing the number of elements required and the use of other types of circuitry to construct the unit, and, therefore, the following problems are associated with that proposed signed digit high-speed arithmetic unit:

(1) As the number of digits of the operands increases, the number of elements required increases, which makes it difficult to fabricate an arithmetic unit capable of handling a large number of digits on a single LSI chip.

(2) When the arithmetic unit is realized using, for example, a MOS circuit which cannot perform NOR and OR operations at the same time, the OR circuit is realized by elements formed in two stages, that is, a NOR gate and an inverter, and the number of stages or gates required in the arithmetic circuit increases correspondingly, resulting in an increase in operation time.

OBJECTS AND SUMMARY OF THE INVENTION

It is an object of the present invention to provide a high-speed arithmetic processor which can readily be fabricated compactly on an LSI chip.

It is another object of the present invention to provide such a high-speed arithmetic processor utilizing combinational circuitry in which signed digit numbers are employed for internal addition and subtraction.

It is another object of the present invention to provide a high-speed arithmetic processor which adopts an array structure and in which the number of required elements (transistors) is substantially reduced (e.g., by half) as compared to prior art high-speed arithmetic processors.

It is another object of the present invention to provide such a high-speed arithmetic processor which minimizes the number of digits which need carry propagation for internal addition and subtraction (e.g., one digit at most).

It is another object of the present invention to provide a high-speed arithmetic processor which is of simplified circuit configuration.

In achieving the above and other objects, the present invention provides an arithmetic processor which comprises: first-step arithmetic means for determining (a) an intermediate carry (or intermediate borrow) for a higher order arithmetic operation from an internal operand such as an augend (or minuend) and an addend (or subtrahend) for each digit in addition (or subtraction) of signed digit numbers, carried out as an internal arithmetic operation, and (b) an intermediate sum (or intermediate difference); second-step arithmetic means for obtaining a final sum (or difference) for a respective digit from the intermediate sum (or intermediate difference) obtained in the first step and an intermediate carry (or intermediate borrow) of a lower order arithmetic operation; and means for either inverting the sign of an internal operand or converting an internal operand to 0 in accordance with the value of a control signal and providing the inverted or converted operand as the internal operand to the first step arithmetic means.

According to a first embodiment, an arithmetic processor performs arithmetic operations by obtaining an intermediate carry or borrow, an intermediate sum and then a final sum or difference for a respective digit from the intermediate carry or borrow, respectively, and a carry or borrow from a lower order arithmetic operation, the arithmetic processor including: first (addend determining or sign inversion) means for receiving a control signal and an operand, and providing one of the operand, a zero and an operand which is inverted in sign from the operand in accordance with the value of the control signal; second (intermediate carry determining) means for receiving internal operands including an augend and an addend or a minuend and a subtrahand, and an operand or zero from the first means and providing an output signal indicating an intermediate carry or borrow, respectively, for a higher order arithmetic operation; third (intermediate sum determining) means for receiving the internal operands and an operand or zero from the first means and providing an intermediate sum or difference, respectively; and fourth (final sum determining) means for receiving the intermediate sum or difference and a signal indicating an intermediate carry or borrow from a lower order arithmetic operation and providing a final sum or difference, respectively. The first means enables the second, third and fourth means to perform arithmetic operations utilizing only addition and/or subtraction steps, whereby arithmetic operations may be executed by the processor utilizing addition and/or subtraction.

According to a preferred first embodiment, the second means and part of the first means comprise an arithmetic cell, and the third means and part of the first means comprise an arithmetic cell, each of the cells performing an arithmetic operation for one digit of an internal operand and being arranged in an array structure.

According to a second embodiment of the invention, the arithmetic processor includes first (sign inversion) means for receiving a control signal and internal operands, and providing either the internal operands or internal operands having a sign inversion in accordance with the value of that control signal; second (divisor conversion) means for receiving a control signal and an operand, and providing either the operand or a zero in accordance with the value of that control signal; third (intermediate carry determining) means for receiving from the first means a zero or an operand including an augend and an addend or a minuend and a subtrahand and the operand from the second means, and providing an output signal indicating an intermediate carry or borrow, respectively, for a higher order arithmetic operation; fourth (intermediate sum determining) means for receiving an operand or zero from the first means and the operand from the second means and providing an intermediate sum or difference, respectively; and fifth (final sum determining) means for receiving the intermediate sum or difference and a signal indicating an intermediate carry or borrow from a lower order arithmetic operation and providing a final sum or difference, respectively. The first and second means enabling the third, fourth and fifth means to perform arithmetic operations utilizing only addition and/or subtraction steps, whereby arithmetic operations may be executed by the processor utilizing addition and/or subtraction.

According to a preferred second embodiment, the third means and part of the first and second means comprise an arithmetic cell, and the fourth means and part of the first and second means comprise an arithmetic cell, each of the cells performing an arithmetic operation for one digit of an internal operand and being arranged in an array structure.

As described in more detail below, arithmetic processors according to the invention use operands in the form redundant numbers in a signed digit expression in which each digit may have a positive value, 0, or a negative value, and internal operands in the form of radix r numbers.

An arithmetic processor according to the invention also includes quotient determining means for determining one digit of a quotient in division and a partial remainder determining means for obtaining a remainder with respect to the quotient determined by the quotient determining means. In the first embodiment, the partial remainder determining means comprises the second, third and fourth means; the second means receives the remainder from the quotient determining means; and the quotient determining means, the partial remainder determining means and the first means are defined by an array structure comprising a plurality of combinational circuitry stages for executing division. Preferably, the quotient determining means includes the first means.

In the second embodiment, the partial remainder determining means comprises the second, third and fourth means, the second means receives the remainder from the quotient determining means; and the quotient determining means, the partial remainder determining means, the first means and the second means are defined by an array structure comprising a plurality of combinational circuitry stages for executing division. Preferably, the quotient determining means includes the first and second means.

A specific embodiment of the invention is described below by way of example with respect to a divider.

The shift-subtract/add division method is generally represented by the following recurrence formula:

$$R^{(j+1)} = r \times R^{(j)} - q_j \times D,$$

where
j = exponent of the recurrence formula,
r = radix,
D = divisor,
$q_j$ = j-th quotient digit from a decimal point,
$r \times R^{(j)}$ = partial dividend before determination of $q_j$, and
$R^{(j+1)}$ = partial remainder after determination of $q_j$.

Thus, the divider can be realized in the form of combinational circuitry by providing, for each value of the index j of the recurrence formula, a quotient-determining cell for determining the quotient $q_j$ and a partial remainder determining circuit which subtracts or does not subtract D from $r \times R^{(j)}$ in accordance with the value of $q_j$. For arithmetic operation, internal operands are expressed using the signed digit expression (hereinafter referred to as "SD expression") in which each digit is expressed by one of the following elements: "0"; a positive integer; and a negative integer corresponding to the positive integer. More specifically, each digit is expressed by any of the following elements: $\{-1, 0, 1\}$; $\{-2, -1, 0, 1, 2\}$; $\{-N, \ldots, -1, 0, 1, \ldots, N\}$, etc., whereby redundancy is provided so that one number can be expressed in a plurality of different ways. This makes it possible to prevent borrow (or carry) propagation in subtraction (or addition) and thus enables parallel subtraction (or addition) to be executed by the combinational circuitry within a predetermined time irrespective of the number of digits of the operands. For example, in the SD expression in which each digit is expressed in an element set $\{-1, 0, 1\}$, it is possible to prevent carry (or borrow) propagation in addition (or subtraction) from occurring at more than one digit. This is described in, for example, *Trans of IECE Japan*, Vol. J67-D, No. 4, 1984, pp. 450 to 457.

Employment of the SD expression for the arithmetic operation as described above enables realization of a high-speed divider. For example, if an SD expression of radix 2 and a signless binary number X consisting of one bit for the integer part and n bits for the decimal part is expressed as follows:

$$X = [x_0.x_1 \ldots x_n]_{SD2},$$

then X may be expressed as follows:

$$\sum_{i=0}^{n} x_i(2^{-i}),$$

where each digit $x_1$ is expressed in an element set $\{-1, 0, 1\}$.

If the divisor D and each partial remainder $R^{(j)}$ in the above-described recurrence formula are expressed in an SD expression of radix 2, it is necessary to add or subtract D in accordance with the value of $q_j$ in such a manner that, when $q_j=-1$, $R^{(j)}$ is shifted leftward by one digit and D is added; when $q_j=0$, $R^{(j)}$ is shifted leftward by one digit; and when $q_j=1$, $R^{(j)}$ is shifted leftward by one digit and D is subtracted.

In particular, according to the present invention, the partial remainder $R^{(j+1)}$ after determination of the j-th quotient digit from a decimal point can be determined by addition using only the SD expression, in accordance with the value of $q_j$ by a means for inverting the sign of an internal operand in the SD expression and a means for assigning "0" to an internal operand, as follows:

$$R^{(j+1)} = p^{(j)}(P^{(j)}(r \times R^{(j)}) + D^{(j)}).$$

P(j) the above relationship is a function for sign inversion, and D(j) and P(j) may be set in a variety of ways, two of which are as follows:

Case (I)

$$D^{(j)} = \begin{cases} \overline{D} & (\text{when } q_j = -1) \\ 0 & (\text{when } q_j = 0) \\ D & (\text{when } q_j = 1) \end{cases}$$

$P^{(j)}(X) = X$ (i.e., $P^{(j)}$ is an identity mapping);

Case (II)

$$D^{(j)} = \begin{cases} D & (\text{when } q_{(j)} = -1) \\ 0 & (\text{when } q_j = 0) \\ D & (\text{when } q_j = 1) \end{cases}$$

$$p^{(j)}(X) = \begin{cases} \overline{X} & (\text{when } q_{(j)} = -1) \\ X & (\text{when } q_j = 0) \\ X & (\text{when } q_j = 1) \end{cases}$$

$\overline{D}$ and $\overline{X}$ are numbers obtained by inverting the signs of D and X in the SD expression. The sign inversion in the SD expression is effected in such a manner that, if the digit is 1, the digit is changed to $-1$; if the digit is $-1$, it is changed to 1; and if the digit is 0, it is left unchanged. However, when D is expressed in the SD expression in which each digit is non-negative as in the case of $\overline{D}$ the sign inversion can be effected by the 2's complement binary representation.

Accordingly, where $D^{(j)}$ and $P^{(j)}$ are set according to Case (II) above, each digit of $D^{(j)}$ is non-negative at all times; and where $D^{(j)}$ and $P^{(j)}(X)$ are set according to Case (I) above, most of the digits except for the most significant digit can be made non-negative by expressing $\overline{D}$ using the 2's complement binary representation. Therefore, a partial remainder may be obtained using an array of 1-digit redundant addition circuits (cells) according to an SD expression in which one operand (addend) is non-negative, and a partial remainder determining circuit for each j may be provided by such an array. Thus, it is possible to reduce the number of elements required for each redundant addition circuit (cell) and provide a high-speed divider circuit in the form of a regularly arranged array of these addition circuits (cells), which makes it possible to fabricate a high-speed divider compactly on a VLSI chip.

BRIEF DESCRIPTION OF THE DRAWINGS

FIG. 7 is a circuit diagram of an embodiment of the transfer gate shown within broken lines in FIG. 6; and FIG. 8 is a circuit diagram showing a CMOS circuit which defines the quotient-determining circuit shown in FIG. 5.

DESCRIPTION OF THE PREFERRED EMBODIMENTS

Figure 1:
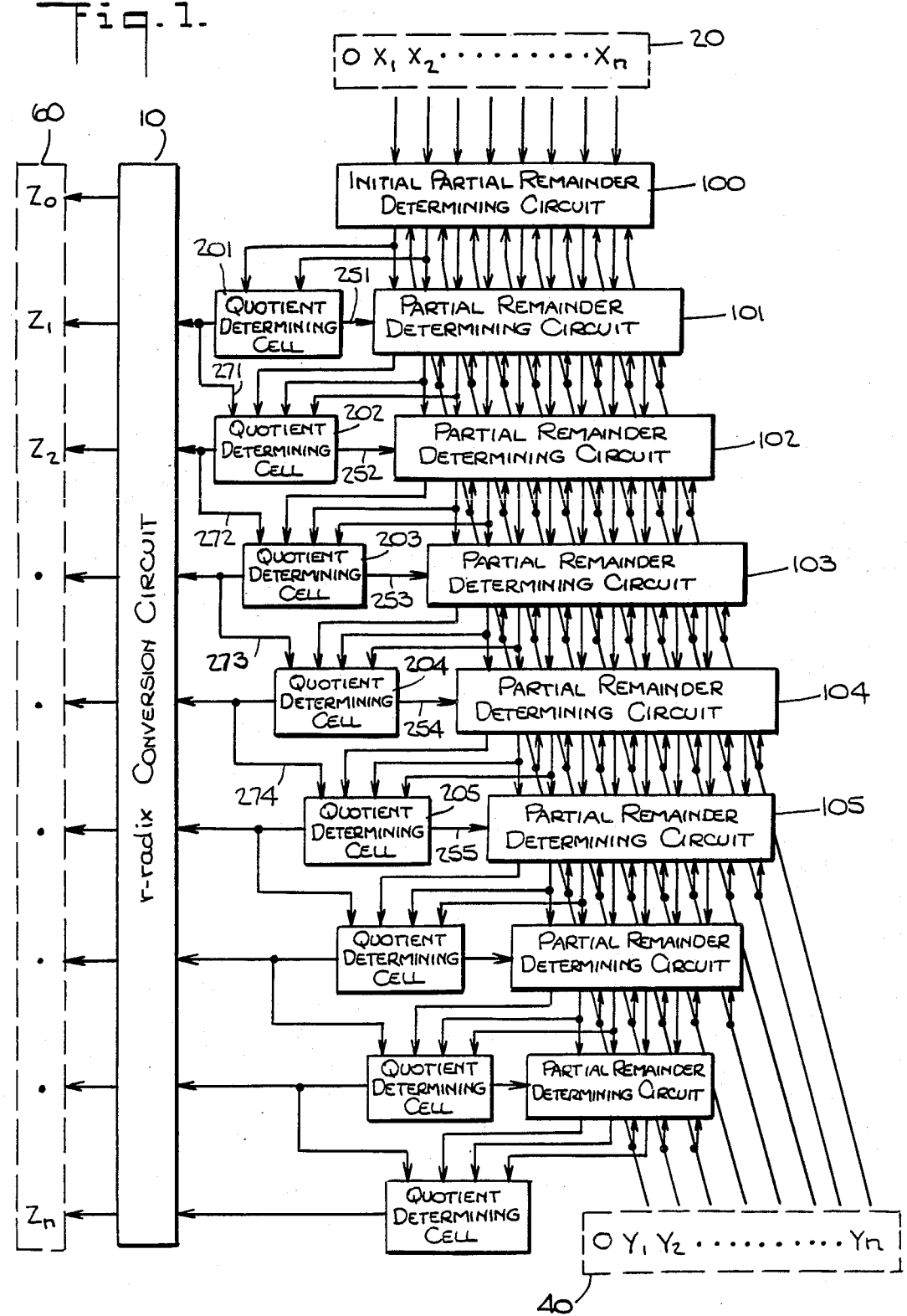
FIG. 1 is a block diagram of an arithmetic processor in accordance with one embodiment of the invention.

FIG. 1 is a block diagram showing one embodiment of the present invention which is described below in connection with a divider for n-digit and r-radix signless decimals, specifically for the case where $n=8$ and $r=2$. Referring to FIG. 1, a dividend within the broken-line block 20 (hereinafter referred to as "divided 20") is input to an initial partial remainder determining circuit 100 in the form of signals respectively corresponding to values $x_1, x_2, \ldots, x_n$ for the 1st, 2nd, ..., n-th digits to the right of the decimal point. Similarly, a divisor within the broken-line box 40 (hereinafter referred to as "divisor 40") is input to the initial partial remainder determining circuit 100 and to the partial remainder determining circuits 101, 102, 103, 104, 105, ... in the form of signals representing values $y_1, y_2, \ldots, y_n$ for the 1st, 2nd, ..., n-th digits to the right of the decimal point. A quotient within broken-line block 60 (hereinafter referred to as "quotient 60") is output from an r-radix conversion circuit 10 in the form of an r-radix number consisting of the 1st integral digit $z_0$ and the 1st decimal digit $z_1$, the second decimal digit $z_2, \ldots$, the n-th decimal digit $z_n$. The initial partial remainder determining circuit 100 receives dividend 20, $[0.x_1x_2\ldots x_n]_r$, and divisor 40, $[0.y_1y_2\ldots y_n]_r$, as its inputs, and outputs a partial remainder, or a value obtained by inverting the sign of this partial remainder, is determined after the 1st integral digit of the quotient. In particular, if the dividend and the divisor are normalized, then $x_1=y_1=1$, is readily obtained. The following description will be made with respect to division in which the dividend and the divisor are normalized.

Each of the partial remainder determining circuits 101, 102, 103, 104, 105 . . . receives the output of a respective partial remainder determining circuit (or the initial partial remainder determining circuit 100) which is immediately above it as viewed in FIG. 1, together with the divisor 40 and a respective control signal 251, 252, 253, 254, 255 . . . which is output from a respective quotient-determining cell 201, 202, 203, 204, 205 ... disposed adjacent to a respective partial remainder determining circuit 101, 102, 103, 104, 105 ..., and outputs a partial remainder or a value obtained by inverting the sign of the partial remainder, which is then input to a subsequent (i.e., lower) partial remainder determining circuit.

Each of the quotient-determining cells 201, 202, 203, 204, 205 ... receives at its inputs the three most significant digits of a partial remainder, or a value obtained by inverting the sign of this partial remainder, output from the partial remainder determining circuit immediately above the respective quotient-determining cell (e.g., from the (j−1)th partial remainder determining circuit), together with the value of the (j−1)th decimal digit of the quotient in the SD expression which has been determined in the quotient-determining cell immediately above (i.e., the j−1th quotient-determining cell), and outputs the value for the j−th decimal digit of the quotient, together with the respective control signal 251, 252, 253, 254, 255 ..., which is supplied to the partial remainder determining circuit in the same stage (i.e, the j−th stage).

The r-radix conversion circuit 10 receives at its inputs the digits of a quotient in the SD expression which have been determined in quotient-determining cells 201, 202, 203, 204, 205 ..., respectively, and outputs a quotient 60, $]z_0.z_1a_2 \ldots z_n]_r$, which is an ordinary r-radix number in which each digit is non-negative.

The division method employing the embodiment of FIG. 1 will briefly be explained using mathematical expressions with respect to two methods for determining $R^{(j+1)}$, i.e. a method in which the addend is inverted (Case (I)) and a method in which the augend is inverted (Case (II)).

Case (I) inversion of the addend (i.e., divisor):

$$R^{(1)}=[0.x_1x_2\ldots x_n]_{SD2}-[0.y_1y_2\ldots y_n]_{SD2}$$

is first calculated in initial partial remainder determining circuit 100 to determine a partial remainder $R^{(1)}$. It should be noted that the relationship above for determining $R^{(1)}$ is calculated in the redundant binary expression (i.e., the SD expression of radix 2), and $R^{(1)}$ is therefore a redundant binary number. Since $x_1=1$ and $y_1=1$, the first integral digit of the quotient is $q_0=1$. Further, since $x_1, x_2, \ldots, x_3, y_1, y_2, \ldots, y_n$ are non-negative, the initial partial remainder determining circuit 100 can readily be realized using a subtraction circuit for handling redundant binary numbers each digit of which is non-negative, or an ordinary subtraction circuit. The relationship above for determining the partial remainder $R^{(1)}$ may be changed as follows:

$$R^{(1)}=[0.x_1x_2\ldots x_n]_{SD2}+[0.\overline{y_1}\overline{y_2}\ldots \overline{y_n}]_{SD2}.$$

In other words, the partial remainder $R^{(1)}$ may be determined by addition of a redundant binary number each digit of which is non-negative and an ordinary redundant binary number. In this case, $\overline{y_i}$ is a value obtained by inverting the sign of $y_i$. More specifically, when $y_i=1$, $\overline{y_i}=-1$, whereas, when $y_i=0$, $\overline{y_i}=0$, where i is an integer having a value from 1 to n. Accordingly, the initial partial remainder determining circuit 100 can also be realized as an addition circuit for an ordinary redundant binary number and a redundant binary number each digit of which is non-negative.

The j−th quotient digit $q_j$ from a decimal point and the partial remainder $R^{(j+1)}$, which is made after determination of the partial remainder $R^{(j)}=[r_0^j.r_1^jr_2^j\ldots r_n^j]_{SD2}$ and the j−1th decimal digit $q_j$ of the quotient, are determined as follows. It is assumed that j is an integer having a value from 1 to n. The j−th decimal digit $q_j$ of the quotient can be determined by the value of the three most significant digits $[r_0^j.r_1^jr_2^j]_{SD2}$ of the partial remainder $R^{(j)}$. More specifically, the determination is made as follows: if the value of the three most significant digits of $R^{(j)}$ is positive, $q_j=1$; if that value is 0, $q_j=0$,; and if that value is negative, $q_j=-1$. Determination of the j−th decimal digit $q_j$ of the quotient is made in the j−th cell (counted from the top of FIG. 1) of the quotient-determining cells 201, 202, 203, 204, 205 ....

The partial remainder $R^{(j+1)}$ is determined in the j−th circuit (counted from the top of FIG. 1) of the partial remainder determining circuits 101, 102, 103, 104, 105 ... by performing the following calculations:

(i) when $q_j=-1$,
$$R^{(j+1)}=[r_0^jr_1^j.r_2^j\ldots r_n^j 0]_{SD2}+[0.y_1y_2\ldots y_n]_{SD2};$$

(ii) when $q_j=1$,
$$R^{(j+1)}=[v_0^jv_1^j.r_2^j\ldots r_n^j 1]_{SD2}+[0.u_1u_2\ldots u_n]_{SD2};$$

where $u_i=1-y_i$ for $i=1, \ldots, n$; when $r_1^j=1$, then $v_0^j=r_0^j$ and $v_1^j=0$; when $r_1^j=0$, then $v_0^j=r_0^j$ and $v_1^j=-1$; and when $r_1^j=-1$, then $v_0^j=0$ and $v_1^j=0$. $\overline{D}$ which is opposite in sign to $D=[0.y_1y_2\ldots y_n]_{SD2}$, is obtained utilizing the fact that $\overline{D}$ can be expressed as follows:

$$\overline{D}=[(-1)..00\ldots 1]_{SD2}=[0.u_1u_2\ldots u_n]_{SD2}.$$

(iii) when $q_j=0$,
$$R^{(j+1)}=[r_0^jr_1^j.r_2^j\ldots r_n^j 0]_{SD2}+[0.00\ldots 0]_{SD2}.$$

In the equations for determining the partial remainder $R^{(j+1)}$ employed in cases (i), (ii) and (iii) above, each digit in the second term is non-negative in all cases, and therefore each of the partial remainder determining circuits 101, 102, 103, 104, 105 ... can be realized using an addition circuit which handles an ordinary redundant binary number and a redundant binary number each digit of which is non-negative, and a circuit which determines an addend. In that case, the control signals 251, 252, 253, 254, 255 ... are $q_j$ in the corresponding stages.

Finally, after each digit $q_j$ of the quotient has been determined for from $j=1$ to $j=n$ as described above to obtain the quotient $Q=[q_0.q_1q_2\ldots q_n]_{SD2}$, the quotient (Q) 60 in the SD expression is converted into $z=[z_0.z_1z_2\ldots z_n]_r$ in an ordinary r-radix (i.e. binary) expression by r-radix conversion circuit 10. Circuit 10 performs ordinary subtraction $Q^+ - Q^-$, that is, circuit 10 subtracts a signless binary number $Q^-$, obtained by changing "−1" digits to "1" in the quotient Q in the redundant binary expression, from a signless binary number $Q^+$, obtained by leaving the "1" digits in the quotient Q unchanged. Circuit 10 can be realized using ripple-carry addition circuitry or carry look-ahead circuitry.

In Case (II) of inversion of the augend (i.e., partial remainder), consider a value $A^{(j)}$ in place of the partial remainder $R^{(j)}$, the former being different from the latter only in terms of sign. The value $A^{(j)}$ will also be referred to hereinafter as a partial remainder. $A^{(j+1)}$ is defined as follows:

$$A^{(j=1)} = p^{(j)}(r \times R^{(j)}) = D^{(j)},$$

where $p^{(j)}$ is a function for effecting sign inversion in accordance with the value of $q_j$ described above.

$$A^{(1)} = [0.\bar{x}_1\bar{x}_2 \ldots \bar{x}_n]_{SD2} + [0.y_1y_2 \ldots y_n]_{SD2}$$

is first calculated in initial partial remainder determining circuit 100 to determine a partial remainder $A^{(1)}$. It should be noted that $\bar{x}_1$ is a number obtained by inverting the sign of $x_1$ for $i = 1, \ldots, n$. Since $y_i$ is non-negative at all times for $i = 1, \ldots n$, initial partial remainder determining circuit 100 can be realized using an addition circuit which handles an ordinary redundant binary number and a redundant binary number each digit of which is non-negative. Circuit 100 can also be realized using a subtraction circuit which handles redundant binary numbers each digit of which is non-negative in the same way is in Case (I). It should be noted that the 1st integral digit of the quotient in the redundant binary expression is $q_0 = 1$ as in Case (I).

Next, a description will be made of the determination of the $j$—th quotient digit $q_j$ from a decimal point and the partial remainder $A^{(j+1)}$ in the case where the partial remainder $A^{(j)} = [a_0^j.a_1^ja_2^j \ldots a_n^j]_{SD2}$ and the $(j-1)$th decimal digit of $q_{j-1}$ of the quotient have already been determined.

The $j$—th decimal $q_j$ of the quotient is determined in accordance with the value of the most significant three digits $[a_0^j.a_1^ja_2^j]_{SD2}$ of the partial remainder $A^{(j)}$ and the $j$—1th decimal digit $q_{j-1}$ of the quotient in the $j$—th cell of the quotient-determining cells 201, 202, 203, 204, 205 . . . . More specifically, determination is made as follows: if the value of the most significant three digits of $A^{(j)}$ is positive, $q_j = \text{sign}(-q_{j-1})$; if it is 0, $q_j = 0$; and if it is negative, $q_j = -\text{sign}(-q_{j-1})$. $\text{sign}(-q_{j-1})$ is defined as follows:

$$\text{sign}(-q_{j-1}) = \begin{cases} 1 & (\text{when } q_{j-1} < 0) \\ 1 & (\text{when } q_{j-1} = 0) \\ -1 & (\text{when } q_{j-1} > 0) \end{cases}$$

In the $j$—th circuit of the partial remainder determining circuits 101, 102, 103, 104, 105 . . . , $$A^{(j+1)} = p^{(j)}(2 \times p^{(j-1)}(A^{(j)})) + D^{(j)}$$

is calculated to determine the partial remainder $A^{(j+1)}$. It should be noted that the first term of the above equation for $A^{(j+1)}$ is as follows:
(i) when $\text{sign}(-q_{j-1}) \times \text{sign}(-q_j) = 1$, $$p^{(j)}(2 \times p^{(j-1)}(A^{(j)})) = [a_0^j a_1^j.a_2^j \ldots a_n^j 0]_{SD2},$$

(ii) when $\text{sign}(-q_{j-1}) \times \text{sign}(-q_j) = -1$, $$p^{(j)}(2 \times p^{(j-1)}(A^{(j)})) = \overline{[a_0^j a_1^j.a_2^j \ldots a_n^j 0]}_{SD2},$$

and the second term is as follows:
(i) when $q_j \neq 0$, $$D^{(j)} = [0.y_1y_2 \ldots y_n]_{SD2};$$

(ii) when $q_j = 0$, $$D^{(j)} = [0.00 \ldots 0]_{SD2}.$$

Thus, each digit is a non-negative redundant binary number. Accordingly, each of the partial remainder determining circuits 101, 102, 103, 104, 105 . . . can be realized using an addition circuit which handles an ordinary redundant binary number and a redundant binary number each digit of which is non-negative, a circuit which inverts a redundant binary number and a circuit which determines an operand. In that case, each of the control signals 251, 252, 253, 254, 255 . . . which are delivered to the corresponding partial remainder determining circuits is formed in accordance with the size of the corresponding quotient digit $q_j$ and as to whether or not $-q_j$ and $-q_{j-1}$ are different from each other in terms of sign.

Finally, the quotient in the redundant binary expression, i.e., $Q = [q_0.q_1q_2 \ldots q_n]_{SD2}$, is converted into a quotient in the ordinary binary expression, i.e., $z = [z_0.z_1z_2,$ in the r-radix conversion circuit 10 in the same way as in Case (I).

The description above was made for performing the Case (II) division method using each of the blocks of the divider embodiment shown in FIG. 1. For Case (I), input signal lines 271, 272, 273, 274 in FIG. 1 for inputting signals to the quotient-determining cells 202, 203, 204, 205, 206 . . . from respective upper quotient-determining cells are not used and therefore may be omitted.

Figure 2:
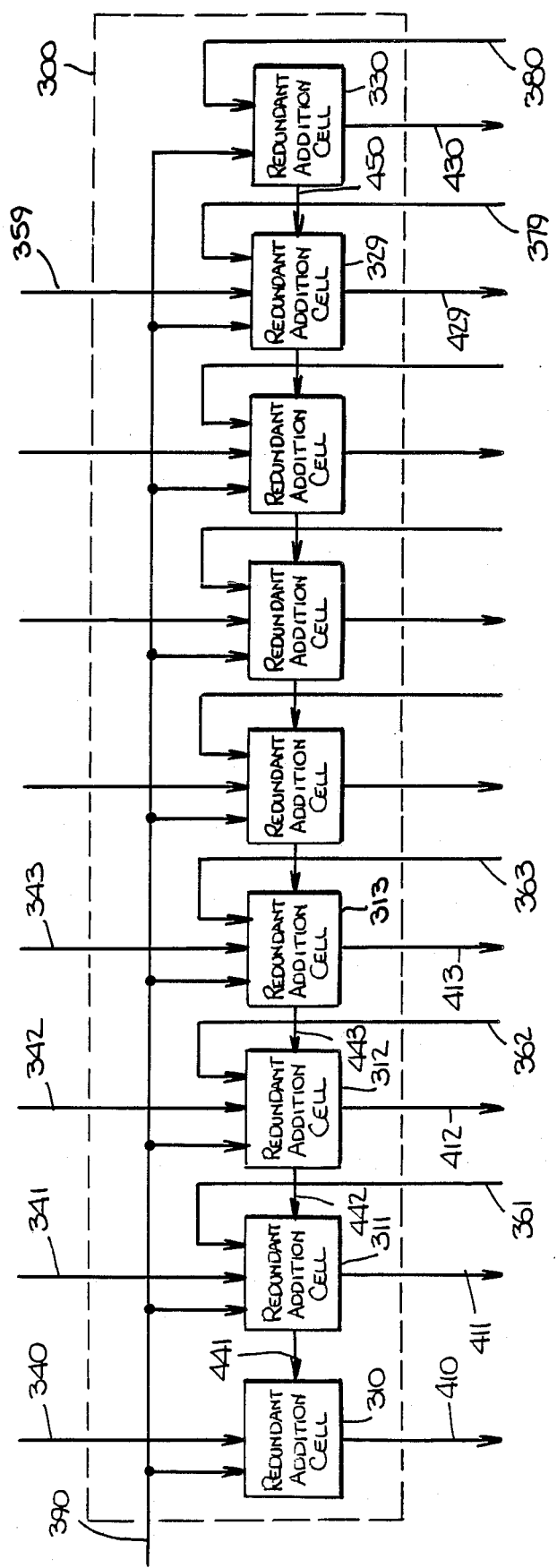
FIG. 2 is a block diagram of one embodiment of each of the partial remainder determining circuits of the arithmetic processor of FIG. 1.

FIG. 2 is a block diagram showing an embodiment of the partial remainder determining circuits 101, 102, 103, 104, 105 . . . of FIG. 1. A partial remainder determining circuit 300 is defined by an array of n+1 redundant addition cells 310, 311, 312, 313 . . . 329, 330. Assuming that partial remainder determining circuit 300 is the $j$—th partial remainder determining circuit in the arrangement shown in FIG. 1, inputs 340, 341, 342, 343 . . . 359 corresponding to augends respectively represent values for digits $r_1^j, r_2^j, \ldots, r_n^j$ of the partial determined in the previous stage (i.e., the $j$—1th stage), or values for $a_1^j, a_2^j, \ldots, a_n^j$. Inputs 361, 362, 363, . . . , 380 corresponding to addends respectively represent digits $y_1, y_2, \ldots, y_n$ of the divisor. Control signal 390 is one of the control signals 251, 252 . . . shown in FIG. 1 and is determined in accordance with the previously determined digit $q_j$ or $q_{j-1}$ of the quotient in the quotient-determining cell in the same stage (i.e., the $j$—th stage). Inputs 441, 442, 443, . . . , 450 which are supplied from lower-order redundant addition cells to higher-order redundant addition cells represent intermediate carries from the lower-order digits. Outputs 410, 411, 412, . . . , 430 of redundant addition cells 310, 311, 312, . . . , 330 respectively represent the values of digits $r_0^{j+1}, r_1^{j+1}, r_2^{j+1}, \ldots, r_n^{j+1}$ of the reamainder or values for $a_0^{j+1}, a_1^{j+1}, a_2^{j+1}, \ldots, a_n^{j+1}$. It should be noted that, when r=2, that is, when the binary expression is employed, the 1st decimal digit of the divisor is fixed as $y_1 = 1$, and therefore input 361 may be omitted. In Case (II), the carry 450 from the final digit may also be omitted.

Redundant addition cells 310, 311, 312, 313, . . . , 329, 330 determine the 1st integral digit, the 1st decimal digit, the 2nd decimal digit, . . . , the n—th decimal digit, respectively, of the partial remainder $R^{(j+1)}$ or $A^{(j+1)}$. Of these redundant addition cells, cells 312, 313, . . . , 329 for the 2nd decimal digit to the n—1th decimal digit may be constituted by basic cells and cells 310 and 311 for the most two significant digits and cell 330 for the least significant digit (i.e., the n—th decimal digit) may be constituted by high order cells for the purpose of reducing the number of elements. Further, redundant addition cells 310 and 311 for the two most significant digits may be combined with the quotient-determining cell in the same stage (i.e., the j—th stage) in the form of a single cell, or redundant addition cell 330 for the least significant digit in the j—th stage and redundant addition cell 329 for the n—1th decimal digit in the j+1th stage may be combined together in the form of a single cell, for the purpose of reducing the number of elements. It is also possible to omit redundant addition cells corresponding to each digit up to the nth decimal digit in the j—th partial remainder determining circuit as long as the condition $n/2 < j \leq n-1$ is satisfied. FIG. 1 shows a first embodiment with such redundant addition cells omitted.

Figure 3:
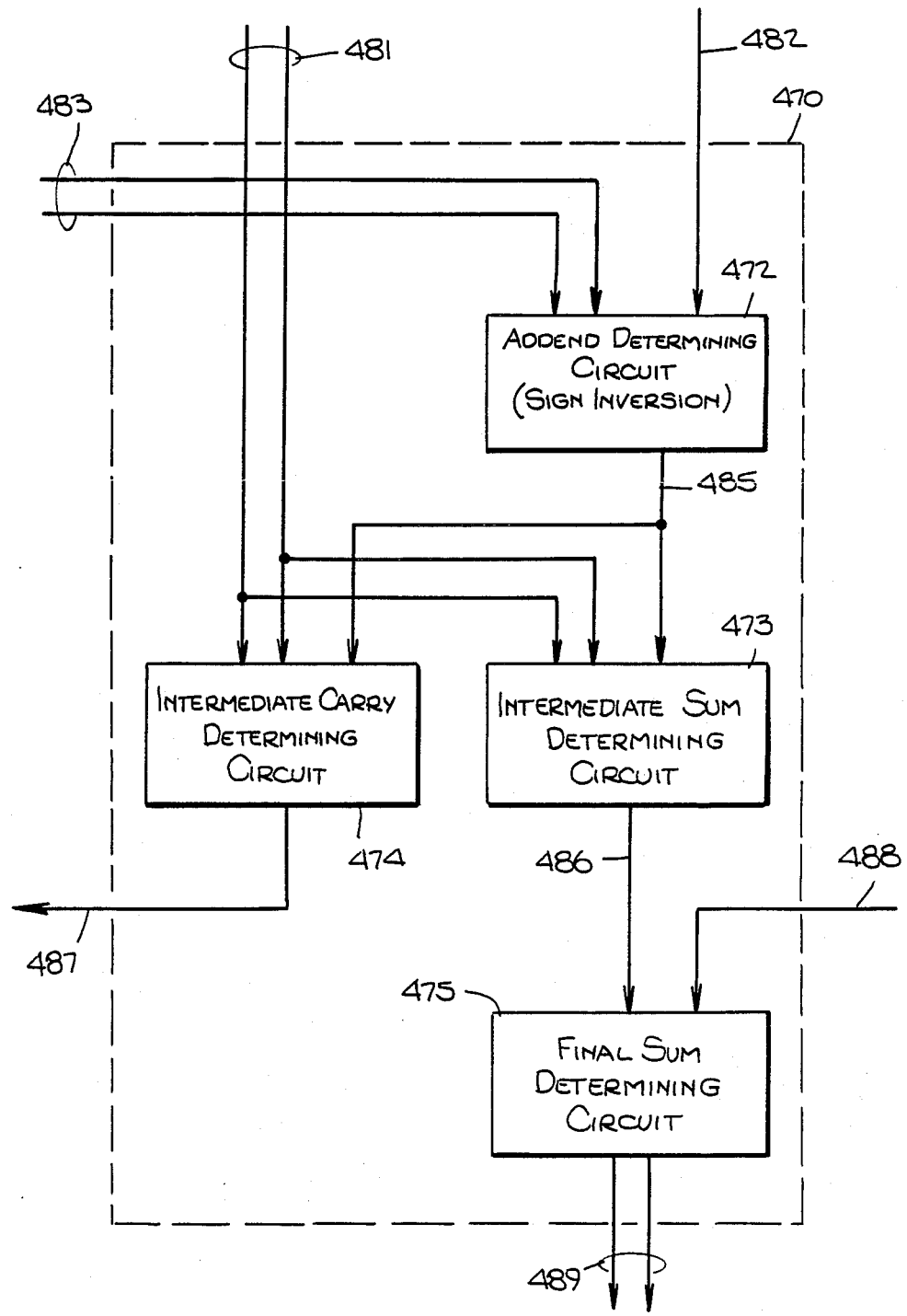
FIG. 3 is a block diagram of one embodiment of the basic cell structure of each redundant addition cell of the partial remainder determining circuit of FIG. 2.

FIG. 3 is a block diagram showing a first embodiment of a basic cell 470 which may constitute each of the redundant addition cells 312, 313, . . . , 329 shown in FIG. 2 for Case (I), that is, in the case of inversion of the addend. Basic cell 470 comprises an addend determining (sign inversion) circuit 472 (first means of the first embodiment) an intermediate sum determining circuit 473 (third means of the first embodiment), an intermediate carry determining circuit 474 (second means of the first embodiment) and a final sum determining circuit 475 (fourth means of first embodiment). Input signal 481 represents the value of the i+1th decimal $r_{i+1}{}^j$ of the partial remainder $R^{(j)}$, and since $r_{i+1}{}^j$ is a redundant binary number, it is a 2-bit signal. Input signal 482 is a signal $d_i$ which represents the value $y_i$ for the i—th decimal digit of the divisor. Since y is a binary number, input signal 482 may be a 1-bit signal. Control signal 483 represents the j—th decimal digit $q_j$ of the quotient and may take any one of the values 1, 0 and —1; therefore, control signal 483 is a 2-bit signal. Addend signal 485 output by addend determining circuit 472 is a binary number having a 0 or 1 level and is, therefore, a 1-bit signal. Signal 486 output by intermediate sum determining circuit 473 is a 1-bit signal which represents the intermediate sum $S_i{}^j$ for the i—th decimal digit. Signal 487 is a 1-bit signal which indicates whether or not there is an intermediate carry from the i—th decimal digit. Signal 488 is a 1-bit signal which indicates whether or not there is an intermediate carry from the i+1th decimal digit. Output 489 from final sum determining circuit 375 is a 2-bit signal which represents the value of the i—th decimal digit $r_i{}^{j+1}$ of the partial remainder $R^{(j+1)}$.

Addend determining circuit 472 determines the i—th decimal digit $d_i{}^{j+1}$ of the addend in accordance with the value for the j—th decimal digit $q_j$ of the quotient. More specifically, circuit 472 determines an addend by inversion of sign or alloting a 0 in such a manner that, when $q_j = -1$, $d_i{}^j = d_i$; when $q_j = 0$, $d_i{}^j = 0$; and when $q_j = 1$, $d_i{}^j = 1 - d_i$.

Intermediate sum determining circuit 473 determines an intermediate sum by redundant addition of a redundant binary augend $r_{i+1}{}^j$ and an ordinary binary addend $d_i{}^j$. More specifically, an intermediate sum is determined as shown in Table 1.

TABLE 1

| | | Augend (redundant binary number) | | |
|---|---|---|---|---|
| | | —1 | 0 | 1 |
| addend (binary number) | 0 | —1 | 0 | —1 |
| | 1 | 0 | —1 | 0 |

Intermediate carry determining circuit 474 determines an intermediate carry by redundant addition of an augend $r_{i+1}{}^j$ and an addended $d_i{}^j$. More specifically, circuit 474 determines an intermediate carry as shown in Table 2.

TABLE 2

| | | Augend (redundant binary number) | | |
|---|---|---|---|---|
| | | —1 | 0 | 1 |
| addend (binary number) | 0 | 0 | 0 | 1 |
| | 1 | 1 | 0 | 1 | 1 |

Final sum determining circuit 475 obtains the sum of the intermediate sum for the i—th decimal digit (signal 486) and the intermediate carry from the i+1th decimal digit (signal 488) and determines the value for the i—th decimal digit $r_i{}^{j+1}$ of the partial remainder $R^{j+1}$.

Figure 4:
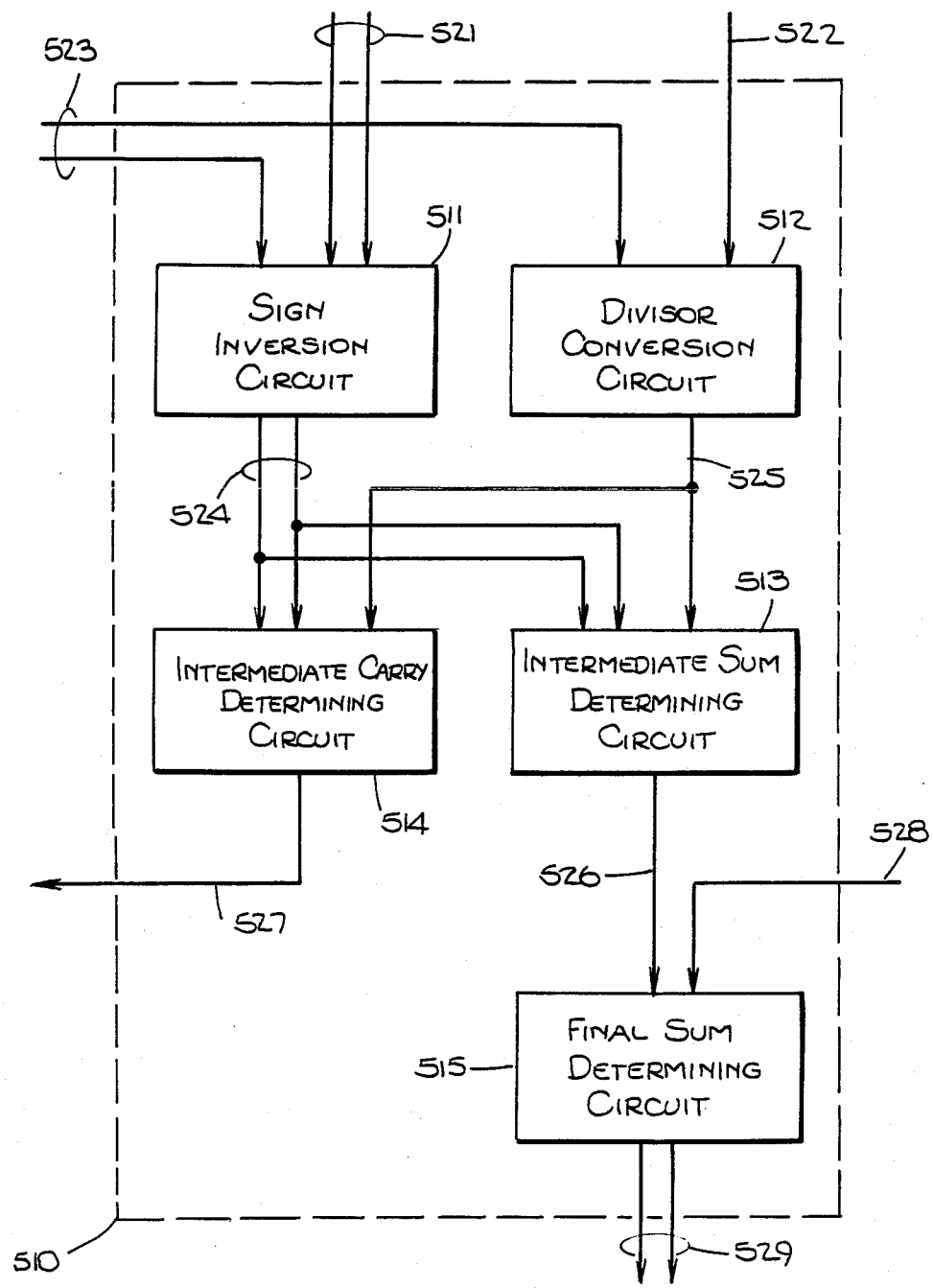
FIG. 4 is a block diagram of another embodiment of the basic cell structure of each redundant addition cell of the partial remainder determining circuit of FIG. 2.

FIG. 4 is a block diagram showing a second embodiment of a basic cell 510 which may constitute each of the redundant addition cells 312, 313, . . . , 329 shown in FIG. 2 for Case (II), that is, in the case of inversion of the augend. Basic cell 510 comprises a sign inversion circuit 511 (first means of second embodiment), a divisor conversion circuit 512 (second means of the second embodiment), an intermediate sum determining circuit 513 (fourth means of the second embodiment), an intermediate carry determining circuit 514 (third means of the second embodiment) and a final sum determining circuit 515 (fifth means of the second embodiment). Input signal 521 is a 2-bit signal which represents the value for the i+1th decimal digit $a_{a+1}{}^j$ of the partial remainder $A^{(j)}$. Control signal 523 is a 2-bit input signal which represents the size of the j—th decimal digit $q_j$ of the quotient and indicates whether or not there is a difference in sign between $-q_{j-1}$ and $-q_j$. Input signal 522 is a signal $d_i$ which represents the value $y_i$ for the i—th decimal digit of the divisor. Signal 524 output by sign inversion circuit 511 is a 2-bit signal which represents a redundant binary augend $e_i{}^j$. Signals 525, output by divisor conversion circuit 512 is a 1-bit signal which represents a binary addend $d_i{}^j$. Signals 526, 527 and 528 represent the same things as signals 486, 487 and 488, respectively, shown in FIG. 3. Output signal 529 from final sum determining circuit 515 is a 2-bit signal which represents the value of the i—th decimal digit $a_i{}^{j+1}$ of the partial remainder $A^{(j+1)}$.

Sign inversion circuit 511 determines the i+1th decimal digit $a_{i+1}{}^j$ of the partial remainder in accordance with the difference in sign between the j—th decimal digit $q_j$ and j—1th decimal digit $q_{j-1}$ of the quotient. More specifically, circuit 511 determines an augend by effecting sign inversion in such a manner that, when sign $(-q_{j-1}) \times \text{sign}(-q_j) = 1$, $e_i{}^j = a_{i+1}{}^j$, whereas when sign $(-q_{j-1}) \times \text{sign}(-q_j) = -1, e_i{}^j = \overline{a_{i+1}{}^j}$. In that case, if $a_{i+1}{}^j = -1$, then $\overline{a_{i+1}{}^j} = 1$; if $a_i{}^j = 0$, then $\overline{a_{i+1}{}^j} = 0$; and if $a_{i+1}{}^j = 1$, then $\overline{a_{i+1}{}^j} = -1$.

Divisor conversion circuit 512 determines the i—th decimal digit $d_i{}^j$ of the addend in accordance with the size of the j—th decimal digit $q_j$ of the quotient. More specifically, circuit 512 determines an addend by assigning a 0 in such a manner that, when $q_j \neq 0$, $d_i{}^j = d_i$ whereas when $q_j = 0$, then $d_i{}^j = 0$. In that case, $d_i$ represents the value for the i—th decimal digit $y_i$ of the divisor.

Intermediate sum determining circuit 513, intermediate carry determining circuit 514 and final sum determining circuit 515 are similar to circuits 473, 474 and 475, respectively, in FIG. 3.

Initial partial remainder determining circuit 100 in FIG. 1 may basically be embodied similar to partial remainder determining circuits 101, 102, . . . , that is, circuit 100 can be defined by an array of cells which are similar to basic cell 470 (FIG. 3) or basic cell 510 (FIG. 4) adapted for the case of $q_0 = 1$. It should be noted that, since initial partial remainder determining circuit 100 performs redundant subtraction of ordinary binary numbers or redundant addition of an ordinary binary number and a redundant binary number each digit of which is non-positive, the intermediate carry for each digit can be made 0 at all times, which makes it possible to simplify the arrangement of each cell.

Figure 5:
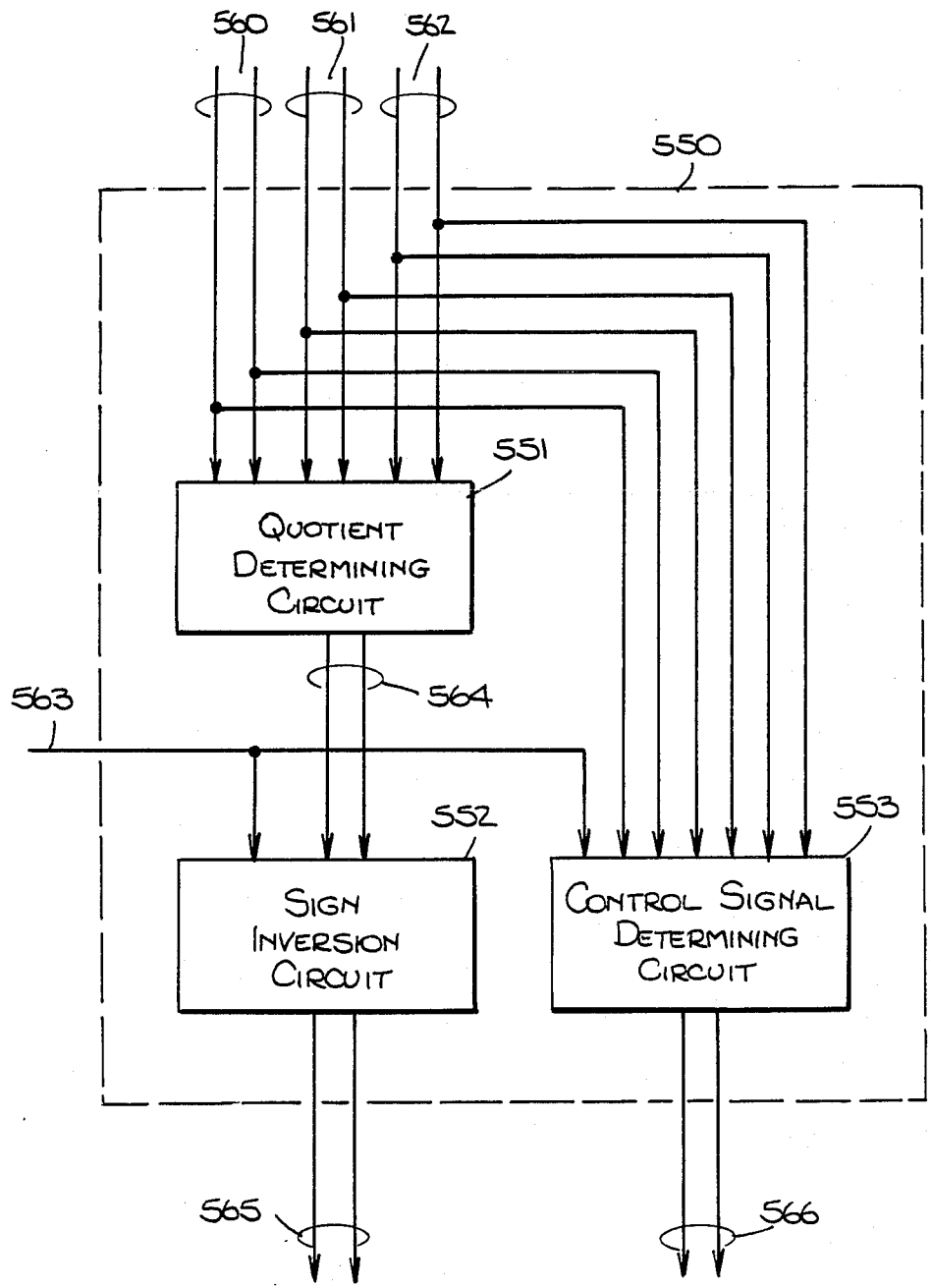
FIG. 5 is a block diagram of one embodiment of each quotient-determining cell of the arithmetic processor of FIG. 1.

FIG. 5 is a block diagram showing an embodiment of a quotient determining cell 550 which may constitute the quotient determining cells 201, 202, 203, 204, 205 . . . shown in FIG. 1. Quotient determining cell 550 comprises a quotient determining circuit 551, a sign inversion circuit 552 and a control signal determining circuit 553. Input signals 560, 561 and 562 are 2-bit signals which respectively represent $r_0^j$, $r_1^j$ and $r_2^j$ of the most significant three digits of the partial remainder or $a_0^j$, $a_1^j$ and $a_2^j$. Input signal 563 is a 1-bit signal which is determined from the $j-1$th decimal digit $q_{j-1}$ of the quotient. Signal 564 output by quotient determining curcuit 551 is a 2-bit signal which represents a tentative value different in sign from the $j-$th decimal digit $q_j$ of the quotient. Output signal 565 from sign inversion circuit 552 is a 2bit signal which represents the value of the $j-$th decimal digit $q_j$ of the quotient. Output signal 566 from control signal determining circuit 553 is a 2-bit control signal which controls a corresponding partial remainder determining circuit 101, 102 . . . .

Quotient determining circuit 551 determines the tentative value of signal 564 for the $j-$th decimal digit $q_j$ of the quotient in accordance with the value $[r_0^j.r_1^jr_2^j]_{SD2}$ of the three most significant digits 560, 561 and 562 of the partial remainder or the value $[a_0^j.a_1^ja_2^j]$. More specifically, when the value of the supper three most significant digits of the partial remainder is positive, the tentative value is 1; when the value of the three most significant digits it is 0, the tentative value is 0; and when the value of the three most significant digits is negative, the tentative value is $-1$.

Sign inversion circuit 552 may be omitted in Case (I), whereas, in Case (II), circuit 552 effects inversion of sign in accordance with the value of the $j-1$th decimal digit $q_{j-1}$ of the quotient to determine the $j-$th decimal digit $q_j$ of the quotient. More specifically, when $q_{j-1}=1$, circuit 552 effects sign inversion so that 1 is replaced with $-1$, and $-1$ is replaced with 1, whereas, when $q_{j-1}=-1$ or 0, circuit 552 outputs the value as it is.

Control signal determining circuit 553 may be omitted in Case (I) since the $j-$th digit $q_j$ of the quotient may be used as a control signal without change. In Case (II), circuit 553 determines the size of $q_j$ and makes a decision as to whether or not there is a difference in sign between $-q_j$ and $-q_{j-1}$. It should be noted that many portions of circuit 553 are common to those of quotient determining circuit 551; therefore, these two circuits are generally combined to commonly use mutual portions to reduce the number of elements required.

Circuits embodying a basic cell 510 and quotient determining cell 550 are described below in connection with Case II, preceded by an example of binary coding of each of the concerned signals.

One digit $a_j$, or $q_j$ in a redundant binary expression is expressed by two bits $a_{j+}+a_{j-}$, or $q_{j+}q_{j-}$, respectively, and $-1$, 0 and 1 are binary-coded into 11, 10 and 01, respectively. At this time, the size and sign of the $j-$th decimal digit $q_j$ of the quotient can be represented by $q_{j-}$ and $q_{j+}$, respectively. Further, the signal which indicates whether or not there is a difference in sign between the $j-$th decimal digit $q_j$ and $j-1$th decimal digit $q_{j-1}$ of the quotient is assumed to be $t_j$. More specifically, it is assumed that, if there is a difference in sign (i.e., when sign $(-q_j) \times \text{sign}(-q_{j-1}) = -1$), then $t_j=0$, whereas, if there is no difference in sign (i.e., when sign $(-q_j) \times \text{sign}(-q_{j-1}) = 1$), then $t_j=1$. Accordingly, $t_j$ can be determined in control signal determining circuit 553 as follows:

$$t_j = a_{0+}^j \cdot (a_{0-}^j + a_{1+}^j) \cdot (a_{0-}^j + a_{1-}^j + a_{2+}^j)$$
$$\cdot \overline{a_{0-}^j + a_{1-}^j - a_{2-}^j + q_{j-1+}}.$$

Further, $q_{j-}$ and $q_{j+}$ can be determined according to the following equations, respectively:

$$q_{j-} = a_{0-}^j + a_{1-}^j + a_{2-}^{j-};$$

$$q_{j+} = (a_{0+}^j + (a_{0-}^j + a_{1+}^j) + (a_{0-}^j + a_{1-}^j + a_{2+}^j)) \oplus$$
$$(g_{j-1+} + q_{j-});$$

where ., + and $\oplus$ represent AND, OR and EX-OR, respectively, and $\overline{a_{i}^j + a_{k+}^j}$ and $\overline{q_{j-}}$ are operators representing logical negation of $a_{i-}^j + a_{k+}^j$ and $q_{j-}$, respectively.

Further, the addend $d_i^j$ on output 525 (FIG. 4), the intermediate sum $S_i^j$ on output 526 and the intermediate carry $C_i^j$ on output 527 can be determined according to the following equations, respectively:

$$d_i^j = y_j \cdot q_j$$

$$S_i^j = a_{i+1}^{-j} \oplus d_i$$

$$C_i^j = (a_{i+1}^j + \oplus t_j) \cdot \overline{a_i^j + 1} + d_i^j \cdot \overline{a_{i+1-}^j}.$$

The output $a_i^{j+1}$ of basic cell 510 can be determined according to the following equations:

$$a_{i+}^{j+1} = \overline{S_i^j + C_{i+1}^j}$$

$$a_{i-}^{j+1} = S_i^j \oplus C_{i+1}^j$$

Figure 6:
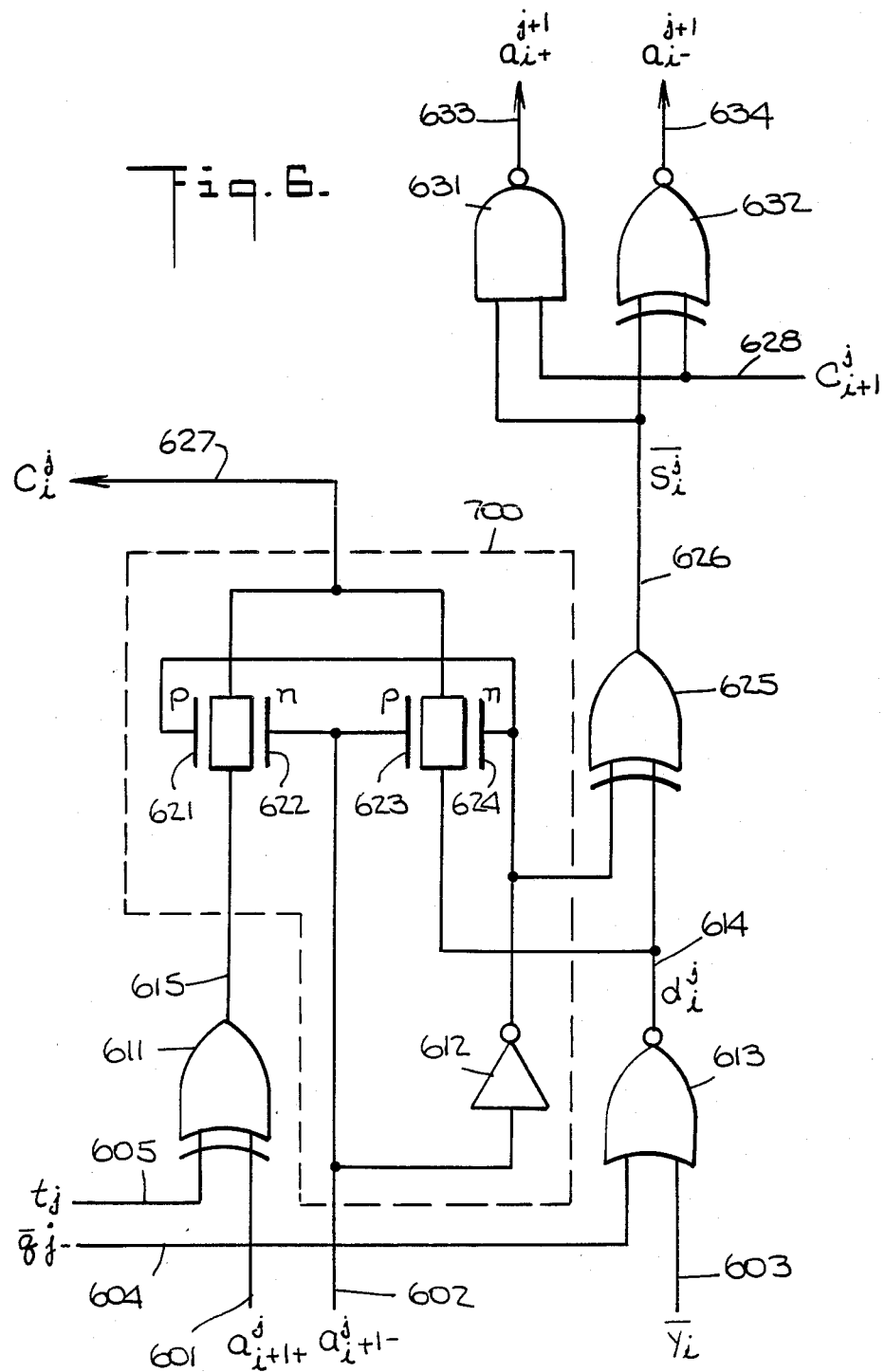
FIG. 6 is a circuit diagram showing a CMOS circuit which defines the basic cell shown in FIG. 4.

FIG. 6 is a circuit diagram of an embodiment of basic cell 510 shown in FIG. 4 which is realized in the form of a CMOS circuit by virtue of the binary coding described above. Gates 611 and 625 are EX-OR gates. Gate 612 is an inverter, gate 613 is two-input NOR gate, gate 631 is a two-input NAND gate, and gate 632 is an EX-NOR gate. A p-channel transistor 621/n-channel transistor 622 pair and a p-channel transistor 623/n-channel transistor 624 pair constitute transfer gates, respectively.

Further, $a_{i+1+}^j$ on input 601 and $a_{i+1-}^j$ on input 602 constitute in combination the 2-bit input signal 521 shown in FIG. 4, and logical negation $\overline{y}_i$ on input 603 of the $i-$th decimal digit $y_i$ is the input signal 522 shown in FIG. 4. Input signals $\overline{q_{j-}}$ on input 604 and $t_j$ on input 605 constitute in combination the 2-bit control signal 523 shown in FIG. 4. Signal $d_i^j$ on output 614 of gate 613 corresponds to the addend 525 shown in FIG. 4. The signals on line 615 (output of gate 611) and on line 602 (output of transistor pairs) represent data corresponding to the augend 524. Signal $\overline{S^j_i}$ on output 626 representing an intermediate sum, and signal $C^j_i$ on output 627 of the transistor pair and $C^j_{i+1}$ on inputs 628 to gates 631 and 632 each indicating whether or not there is an intermediate carry, correspond to the 1-bit signals 526, 527 and 528, respectively. Signals $a_{i+}{}^{j+1}$ on output 633 of gate 631 and $a_{i-}{}^{j+1}$ on output 634 of gate 632 constitute in combination with 2-bit signal 529 (FIG. 4) the i−th decimal digit of the partial remainder which is shown in FIG. 4.

Divisor conversion circuit 512 shown in FIG. 4 is constituted by NOR gate 613 in FIG. 6; sign inversion circuit 511 is constituted by EX-OR gate 611 and transfer gates 621, 622; the core of the intermediate sum determining circuit 513 is constituted by EX-OR gate 625; intermediate carry determining circuit 514 is constituted by inverter 612, transfer gates 621, 622 and transfer gates 623, 624; and final sum determining circuit 515 is constituted by NAND gate 631 and EX-NOR gate 632.

It should be noted that, although transfer gates are employed in this embodiment, it is also possible to realize basic cell 510 using ordinary gates.

FIG. 7 shows an embodiment of the transfer gate portion 700 of the circuit shown in FIG. 6 in which portion 700 is constituted by NOR gates. Gates 701, 702 and 703 are 2-input NOR gates, gate 701 with inverter 612 constituting a part of sign inversion circuit 511 shown in FIG. 4, while gates 702 and 703 constitute intermediate carry determining circuit 527. However, since the arrangement shown in FIG. 7 leads to an increase in the number of stages and elements of the circuit, composite gates may be employed to realize circuit portion 700 of FIG. 6.

A description of a CMOS circuit embodiment of quotient determining cell 550 shown in FIG. 5, realized by virtue of the above-described binary coding system, will now be made with reference to FIG. 8. In FIG. 8, gate 811 is an inverter, gates 813 and 823 are two-input NOR gates, gates 814, 815 and 822 are three-input NOR gates, gates 812 and 821 are four-input NOR gates, and gate 831 is an EX-NOR gate.

Signal $a^j_{0+}$ on input 801 and signal $a^j_{0-}$ on input 802 constitute in combination the 2-bit input signal 560 shown in FIG. 5; signal $a^j_{1+}$ on output 803 and signal $a^j_{1-}$ on output 804 constitute the 2-bit input signal 561; and signal $a^j_{2+}$ on input 805 and signal $a^j_{2-}$ on input 806 constitute the 2-bit input signal 562. Signal $q_{j-1+}$ on output 807 corresponds to input signal 563 from a higher-order quotient determining cell shown in FIG. 5. Signal $q_{j+}$ on output 832 and signal $\overline{q_{j-}}$ on output 833 constitute in combination 2-bit signal 565 representing the j−th decimal digit of the quotient; and signal $\overline{q_{j-}}$ on output 833 and signal $t_j$ on output 834 constitute the 2-bit signal for controlling each of the basic cells 510 in the j−th stage.

Quotient determining circuit 551 shown in FIG. 5 is constituted by inverter 811 and NOR gates 813, 814 and 815 in FIG. 8, and sign inversion circuit 552 in FIG. 5 is constituted by NOR gate 823 and EX-NOR gate 831 in FIG. 8. Control signal determining circuit 553 in FIG. 5 is constituted by inverter 811 and NOR gates 812, 813, 814, 821 and 815 in FIG. 8. It should be noted that inverter 811 and NOR gates 813, 814 and 815 are used in common by quotient determining circuit 551 and control signal determining circuit 553.

Although in the above-described embodiment of a CMOS circuit for Case (II) the same sign is allotted to the partial remainder $a^j_i$ and the quotient $q_j$ in the binary coding, these values may be binary-coded so as to have different signs. A CMOS circuit embodiment for Case (I) can similarly be realized. Although addition of a redundant binary number and an ordinary binary number alone has been described above for Case (II), a similar embodiment can be formed with respect to subtraction of a redundant binary number and an ordinary binary number.

It should be noted that, when the basic cell shown in FIG. 6 employs 6-transistor EX-OR and EX-NOR gates, the number of transistors is 32, and the number of gates on the critical path is 3. In the quotient determining cell shown in FIG. 8, the number of transistors is 50, and the number of gates on the critical path is 2.

Although in the described embodiment the divider is realized by binary logic using CMOS circuits, the present invention can also readily be realized using other kinds of circuitry (e.g., NMOS, ECL, TTL, etc.) or higher-radix logics. Further, the present invention can similarly be realized with respect to a multiplier.

According to the present invention, a divider can be realized by combinational CMOS circuitry having an array structure formed from regularly arranged basic cells and quotient determining cells. Each basic cell involves a delay in arithmetic operations required per digit of a quotient equivalent to 5 gates and includes about 30 transistors, and each quotient determining cell includes about 50 transistors.

Accordingly, the divider according to the present invention has a reduced number of transistors which is substantially half of that in the conventional shift, subtract restore, divide units using ripple-carry addition units, and the calculation time (the number of transfer gates) is reduced to about 1/12 and about 1/24 of those of the prior art in the case of division operations with 32 bits and 64 bits, respectively. Further, the number of transistors required in the divider according to the present invention is substantially half of that of the conventional shift, subtract, restore divide units using redundant binary addition and subtraction units.

Thus, the present invention is effective in reducing the number of circuit elements required to form a divider, enabling a divider to be realized compactly on a VLSI chip and increasing operational speed.

According to the present invention, addition and subtraction in an arithmetic operation such as division or multiplication can be realized in the form of a combinational circuitry using either a redundant addition circuit employing, for example, numbers in the signed digit (SD) expression in which each digit is allowed to have a negative value, or a redundant subtraction circuit, and it is possible to minimize carry or borrow propagation in addition or subtraction to one digit at most, thus providing the following advantages:

(1) it is possible to halve the number of elements required to constitute an arithmetic processor;

(2) since addition and subtraction can be performed at high speed within a predetermined period of time irrespective of the number of digits, it is possible to increase the operational speed of the arithmetic processor; and (3) the arithmetic processor can readily and economically be realized compactly on a LSI chip.

What is claimed is:

1. An arithmetic processor which performs addition or subtraction of two redundant signed-digit numbers X and Y of radix r having N digits denoted by single digits $x_i$ and $y_i$, where i is an index which assumes integer values ranging from 1 to N to denote digits in descending order, said arithmetic processor for each order comprising:
(a) means for receiving a control signal and a single digit, and in response to the value of said control signal, producing an output operand by either inverting the sign of said single digit, leaving said single digit unchanged, or replacing said single digit operand with 0;
(b) a first arithmetic means for receiving said output operand and for receiving a second single digit, and determining therefrom, in the case of addition an intermediate sum and an intermediate carry, or, in the case of subtraction, determining therefrom an intermediate difference and an intermediate borrow, said intermediate carry or borrow being output by said first arithmetic means for utilization in the processing of the next higher order digits; and
(c) a second arithmetic means for determining the final sum by combining an intermediate carry obtained from processing the digits of the next lower order and said intermediate sum, or in the case of subtraction, determining the final difference by combining an intermediate borrow obtained from processing the digits of the next lower order and said intermediate difference;
whereby said arithmetic processor performs addition or subtraction of said two redundant signed-digit numbers X and Y in a manner which eliminates carry-propagation.

2. An arithmetic processor which performs addition or subtraction of two redundant signed-digit numbers X and Y of radix r having N digits denoted by single digits $x_i$ and $y_i$, where i is an index which assumes integer values ranging from 1 to N to denote digits in descending order, said arithmetic processor for each order comprising:
(a) first means for receiving a control signal and a single digit, and in response to the value of said control signal, producing an output operand by either inverting the sign of said single digit, leaving said single digit unchanged, or replacing said single digit with 0;
(b) second means for receiving said output operand from said first means and for receiving a second single-digit and in the case of addition, determining therefrom, an intermediate carry or, in the case of subtraction, determining therefrom an intermediate borrow, said intermediate carry or borrow being output by said second means for utilization in the processing of the next higher order digits; and
(c) third means for receiving said output operand from said first means and for receiving said second single digit, determining therefrom an intermediate sum, or in the case of subtraction, an intermediate difference, and combining the intermediate carry, or in the case of subtraction, the intermediate borrow obtained from the processing of digits of the next lower order with said intermediate sum or difference respectively to determine a final sum or difference;
whereby said arithmetic processor performs addition or subtraction of said two redundant signed-digit numbers X and Y in a manner which eliminates carry-propagation.

3. An arithmetic processor in accordance with claim 2 wherein said first, second and third means are incorporated into each of a plurality of redundant arithmetic cells connected in an array, said array performing addition or subtraction operations on said single digits of said redundant signed-digit numbers X and Y to obtain a sum or difference.

4. An arithmetic processor which performs addition or subtraction of two redundant signed-digit numbers X and Y of radix r having N digits denoted by single digits $x_i$ and $y_i$, where i is an index which assumes integer values ranging from 1 to N to denote digits in descending order, said arithmetic processor for each order comprising:
(a) means for receiving a control signal and a single digit, and in response to the value of said control signal, producing a first output operand by either inverting the sign of said single digit or leaving said single digit unchanged;
(b) second means for receiving a control signal and a second single digit, and in response to the value of said control signal, producing a second output operand by either leaving said second single digit unchanged, or replacing said second single digit with 0;
(c) third means for receiving said first and second output operands, and in the case of addition, determining therefrom an intermediate carry, or in the case of subtraction, determining therefrom an intermediate borrow, said intermediate carry or intermediate borrow being output by said third means for utilization in the processing of the next higher order digits;
(d) fourth means for receiving said first and second output operands, and, in the case of addition determining therefrom an intermediate sum, or in the case of subtraction determining therefrom an intermediate difference; and
(e) fifth means for receiving the intermediate sum or difference from said fourth means and an intermediate carry or borrow from the processing of the next lower order digits and respectively determining therefrom a final sum or difference in the form of a signed-digit number of radix r.

5. An arithmetic processor in accordance with claim 4 wherein said first, second, third, fourth and fifth means are incorporated into each of a plurality of redundant arithmetic cells connecting in an array, said array performing addition or subtraction operations on said single digits of said redundant signed digit numbers X and Y to obtain a sum or difference.

6. An arithmetic processor for performing internal addition or subtraction operations using signed-digit radix r arithmetic on an r-radix signed-digit number and an ordinary r-radix number, said arithmetic processor comprising:
(a) first means for receiving a control signal and a digit of said ordinary r-radix number, and in response to the value of said control signal producing an output digit by either leaving said digit unchanged, replacing said digit with 0, or obtaining the logical inversion of said digit;
(b) second means for receiving said output digit and for receiving a digit of the said redundant signed-digit number, and in the case of addition, determining therefrom an intermediate carry, or in the case of subtraction, determining therefrom an intermediate borrow, said intermediate carry or borrow being output by said second means for utilization in the processing of the next higher order digits;

(c) third means for receiving said output digit and for receiving a digit of said redundant signed-digit number, and determining therefrom in the case of addition, an intermediate sum digit, or in the case of subtraction, determining therefrom an intermediate difference digit; and (d) fourth means for receiving said intermediate sum or difference digit and an intermediate carry or borrow from the processing of the next lower order digits, and combining said intermediate sum and carry digits, or in the case of subtraction, combining said intermediate difference and borrow digits to determine therefrom a final sum or difference digit in the form of a signed-digit of radix r.

7. An arithmetic processor in accordance with claim 6 wherein the radix r=2.

8. An arithmetic processor in accordance with claim 6, wherein said first, second, third and fourth means are incorporated into each of a plurality of redundant arithmetic cells connecting in an array, said array performing addition or subtraction operations on said single digits of said r-radix signed-digit number and said ordinary r-radix number.

9. An arithmetic processor in accordance with claim 8, wherein the radix r=2.

10. An arithmetic processor in which a divider performs division in a plurality of stages, said divider having a quotient determining means for determining each digit of a quotient and partial remainder determining means for determining a partial remainder corresponding to each digit of the quotient, said partial remainder determining means for each digit comprising:

(a) first means for receiving a digit of said quotient from said quotient determining means for use as a control signal, and for receiving a digit of an r-radix divisor, and determining therefrom an output digit, depending upon the value of said control signal;

(b) second means for receiving a digit of the partial remainder expressed as a signed-digit number of radix r derived from a higher stage operation and said output digit, and determining therefrom an intermediate carry;

(c) third means for receiving a digit of the partial remainder expressed as a signed-digit number of radix r derived from a higher stage operation and said output digit, and determining therefrom an intermediate sum; and (d) fourth means which combines said intermediate sum with an intermediate carry from a lower order arithmetic operation to determine therefrom one digit of said partial remainder as a signed-digit number of radix r.

11. An arithmetic processor in accordance with claim 10, wherein the radix r=2.

12. An arithmetic processor in accordance with claim 10 wherein said quotient determining means and said partial remainder determining means are incorporated into each of a plurality of arithmetic cells connected in an array, said array performing division.

13. An arithmetic processor which performs addition or subtraction operations utilizing radix r signed-digit arithmetic on a signed-digit number of radix r and an ordinary number of radix r comprising:

(a) first means for receiving a control signal and a digit of said signed-digit number of radix r, and in response to the value said control signal, producing a first output digit by either inverting the sign of said single digit or leaving said single digit unchanged;

(b) second means for receiving a control signal and a digit of said ordinary number of radix r, and in response to the value said control signal, producing a second output digit by either leaving said digit of said ordinary number unchanged, or replacing said digit of said ordinary number with 0;

(c) third means for receiving said first and second output digits, and for the case of addition determining therefrom an intermediate carry or for the case of subtraction determining therefrom an intermediate borrow, said intermediate carry or borrow being output by said third means for utilization in the processing of the next higher order digits;

(d) fourth means for receiving said first and second output digits, and in the case of addition determining therefrom an intermediate sum, or in the case of subtraction determining therefrom an intermediate difference; and (e) fifth means for receiving the intermediate sum or difference from said fourth means and an intermediate carry or borrow from the processing of the next lower order digits and respectively determining therefrom a final sum or difference in the form of a signed-digit of radix r.

14. An arithmetic processor in accordance with claim 13, wherein said first, second, third, fourth and fifth means are incorporated into each of a plurality of redundant arithmetic cells connecting in an array, said array performing addition or subtraction operations on said single digits of said redundant signed-digit number of radix r and said ordinary number of radix r.

15. An arithmetic processor in accordance with claim 14, wherein said radix r is radix 2.

16. An arithmetic processor of claim 13 in which a divider performs division in a plurality of stages, said divider having a quotient determining means for determining each digit of a quotient and partial remainder determining means for determining a partial remainder corresponding to each digit of the quotient, wherein said partial remainder determining means for each digit comprises:

(a) first means for receiving a digit of said quotient from said quotient determining means for use as said control signal, and a digit of the partial remainder determined in the previous higher stage operation expressed as a signed-digit of radix r and determining therefrom an output digit, depending upon the value of the control signal, (b) second means for receiving a digit of said quotient from said quotient determining means for use as a control signal, and a digit of a divisor expressed as an ordinary number of radix r, producing therefrom a second output digit of radix r;

(c) third means for receiving said first and second output digits and determining therefrom an intermediate carry or borrow;

(d) fourth means for receiving said first and second output digits and determining therefrom an intermediate sum or difference; and (e) fifth means for combining said intermediate carry or borrow with said intermediate sum or difference respectively to form a digit of a partial remainder expressed as a signed- digit of radix r.

17. An arithmetic processor in accordance with claim 16, wherein said radix r is radix 2.

18. An arithmetic processor in accordance with claim 16, wherein said first, second, third, fourth and fifth means are incorporated in each of a plurality of partial remainder determining cells connected in an array, said array, in combination with said quotient determining means performing division operations.

19. An arithmetic processor in accordance with claim 16, wherein said quotient determining means includes said first means.

20. An arithmetic processor in accordance with claim 13, wherein said radix r is radix 2.

* * * * *

UNITED STATES PATENT AND TRADEMARK OFFICE
CERTIFICATE OF CORRECTION

PATENT NO. : 4,873,660                                    Page 1 of 4

DATED : October 10, 1989

INVENTOR(S) : Tamotsu Nishiyama and Shigeo Kuninobu

It is certified that error appears in the above-identified patent and that said Letters Patent is hereby corrected as shown below:

Col. 5, line 18   "$R^{(J+1)}=p^{(J)}(P^{(J)}(rxR^{(J)})+D^{(J)})$"   should be   "$R^{(J+1)}=P^{(J)}(P^{(J)}(rxR^{(J)})+D^{(J)})$"

line 30   "Case (I)    "   should be   "Case (I)    "

$$D^{(J)} = \begin{cases} D & (\text{when } q_J = -1) \\ 0 & (\text{when } q_J = 0) \\ D & (\text{when } q_J = 1) \end{cases} \qquad D^{(J)} = \begin{cases} D & (\text{when } q_J = -1) \\ 0 & (\text{when } q_J = 0) \\ \overline{D} & (\text{when } q_J = 1) \end{cases}$$

line 40   "

$$P^{(J)}(X) = \begin{cases} X & (\text{when } q_{(J)} = -1) \\ X & (\text{when } q_J = 0) \\ X & (\text{when } q_J = 1) \end{cases} \text{" should be "} \quad P^{(J)}(X) = \begin{cases} X & (\text{when } q_{(J)} = -1) \\ X & (\text{when } q_J = 0) \\ \overline{X} & (\text{when } q_J = 1) \end{cases}$$ "

Col. 9, line 4   "$A^{(J+1)}=P^{(J)}(rxR^{(J)})=D^{(J)}$"   should be   "$A^{(J+1)}=P^{(J)}(rxR^{(J)})+D^{(J)}$"

line 44   "

$$\text{sign}(-q_{J-1}) = \begin{cases} 1 & (\text{when } q_{J-1} < 0) \\ 1 & (\text{when } q_{J-1} = 0) \\ -1 & (\text{when } q_{J-1} > 0) \end{cases} \text{" should be "} \quad \text{sign}(-q_{J-1}) = \begin{cases} 1 & (\text{when } q_{J-1} < 0) \\ 1 & (\text{when } q_{J-1} = 0) \\ -1 & (\text{when } q_{J-1} > 0) \end{cases}$$ "

UNITED STATES PATENT AND TRADEMARK OFFICE
CERTIFICATE OF CORRECTION

PATENT NO. : 4,873,660

DATED : October 10, 1989

INVENTOR(S) : Tamotsu Nishiyama and Shigeo Kuninobu

It is certified that error appears in the above-identified patent and that said Letters Patent is hereby corrected as shown below:

| | | | |
|---|---|---|---|
| Col. 12, line 2 | "minesan" | should be | "mines an" |
| line 3 | "addended" | should be | "addend" |
| Col. 13, line 43 | "digits it is 0" | should be | "digits is 0" |

Col. 14, line 18    "$.a_{0-}^j + a_{1-}^j a_{2-}^j + q_{J-1+})$" should be "$\bullet (a_{0-}^j + a_{1-}^j + a_{2-}^j + q_{J-1+})$"

line 25    "$q_{J+} = (a_{0+}^j + (a_{0-}^j + a_{1+}^j) + (a_{0-}^j + a_{1-}^j + a_{2+}^j)) \oplus (g_{J-1+} + q_{J-})$"

should be

"$q_{J+} = (\overline{a_{0+}^j} + (\overline{a_{0-}^j + a_{1+}^j}) + (\overline{a_{0-}^j + a_{1-}^j + a_{2+}^j})) \oplus (q_{J-1+} + \overline{q_{J-}})$"

line 37    "$d_i^j = y_J \cdot q_i$" should be "$d_i^j = y_i \bullet q_{J-}$"

UNITED STATES PATENT AND TRADEMARK OFFICE
CERTIFICATE OF CORRECTION

PATENT NO. : 4,873,660

DATED : October 10, 1989

INVENTOR(S) : Tamotsu Nishiyama and Shigeo Kuninobu

It is certified that error appears in the above-identified patent and that said Letters Patent is hereby corrected as shown below:

Col. 17, line 18, "digits" should be "digit"

line 21, "digits" should be "digit"

line 25, "digits" should be "digit"

line 39, "single digit" should be "single digit $x_i$"

line 46, "single-digit" should be "single digit $x_i$"

line 51, "digits" should be "digit"

line 54, "single digit" should be "single digit $y_i$"

line 58, "digits" should be "digit"

Col. 18, line 12, "means" should be "first means"

Col. 19, line 67, "value said" should be "value of said"

Col. 20, line 5, "value said" should be "value of said"

Col. 20, line 50, "an output" should be "a first output"

line 51, "," should be ";"

Col. 20, line 36, "14" should be "13"

line 37, delete "of Claim 13"

line 68, "16" should be "14"

UNITED STATES PATENT AND TRADEMARK OFFICE
CERTIFICATE OF CORRECTION

PATENT NO. : 4,873,660

DATED : October 10, 1989

INVENTOR(S) : Tamotsu Nishiyama and Shigeo Kuninobu

It is certified that error appears in the above-identified patent and that said Letters Patent is hereby corrected as shown below:

Col. 22, line 6, "13" should be "16"

Signed and Sealed this

Twenty-eighth Day of May, 1991

Attest:

HARRY F. MANBECK, JR.

Attesting Officer

Commissioner of Patents and Trademarks